US009412410B1

(12) United States Patent
Bentley et al.

(10) Patent No.: US 9,412,410 B1
(45) Date of Patent: Aug. 9, 2016

(54) TRACK-DEPENDENT DECODING

(71) Applicant: International Business Machines Corporation, Armonk, NY (US)

(72) Inventors: Steven R. Bentley, Tucson, AZ (US); Roy D. Cideciyan, Rueschlikon (CH); Simeon Furrer, Altdorf (CH); Keisuke Tanaka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/946,580

(22) Filed: Nov. 19, 2015

(51) Int. Cl.
| *G11B 20/18* | (2006.01) |
| *G11B 20/10* | (2006.01) |
| *G11B 5/008* | (2006.01) |
| *G11B 5/29* | (2006.01) |

(52) U.S. Cl.
CPC ...... *G11B 20/10388* (2013.01); *G11B 5/00813* (2013.01); *G11B 5/29* (2013.01)

(58) Field of Classification Search
None
See application file for complete search history.

(56) References Cited

U.S. PATENT DOCUMENTS

| 5,598,277 | A * | 1/1997 | Kim | G11B 20/1813 386/241 |
| 6,272,659 | B1 | 8/2001 | Zook | |
| 6,631,485 | B1 | 10/2003 | Morley et al. | |
| 2003/0101408 | A1* | 5/2003 | Martinian | H03M 13/03 714/776 |
| 2010/0232047 | A1* | 9/2010 | Cherubini | G11B 20/1202 360/48 |
| 2014/0359396 | A1* | 12/2014 | Cideciyan | G06F 11/10 714/764 |
| 2015/0046767 | A1* | 2/2015 | Cideciyan | H03M 13/2909 714/755 |

OTHER PUBLICATIONS

Al-Shahrani et al., "An Efficient Multiple-Errors and Multiple-Erasures Decoding Algorithm for Multitrack Magnetic Recording Channels," Proceedings of the International Conference on Information Technology: Computers and Communications, IEEE, Apr. 28-30, 2003, 5 pages.
Bailey, et al., "Pointer Collection and Reporting for Error Recovery Procedures Branching," ip.com, Jul. 1996, vol. 39, No. 07, pp. 87-90.

* cited by examiner

*Primary Examiner* — Peter Vincent Agustin
(74) *Attorney, Agent, or Firm* — Zilka-Kotab, PC

(57) ABSTRACT

In one embodiment, a tape drive includes a magnetic head having a plurality of read sensors, each read sensor being configured to read data simultaneously, a controller, and logic integrated with and/or executable by the controller. The logic is configured to read, using the plurality of read sensors, encoded data from a plurality of tracks of a magnetic tape medium simultaneously. The logic is also configured to perform track-dependent erasure decoding on the encoded data based on detection of one or more time-varying signal quality issues associated with at least one of the plurality of tracks read simultaneously from the magnetic tape medium.

25 Claims, 12 Drawing Sheets

TRACK-DEPENDENT DECODING

BACKGROUND

The present invention relates to tape storage systems, and more specifically, to selectively applying erasure decoding on a per-track basis.

Currently-used linear tape drives apply product codes for error-correction coding (ECC). These product codes contain two Reed-Solomon component codes consisting of a C1 row code and a C2 column code. Failure to decode a product codeword, which requires successful decoding of all C1 rows and all C2 columns within a product code, leads to a temporary and/or permanent error. These temporary or permanent errors are a significant problem when attempting to store data to tape.

Typically, current tape drives implement ECC with two modes of operation: 1) Error-only decoding (decoding in which no information about uncorrectable C1 codewords is passed to the C2 decoder); and 2) Erasure-decoding (decoding in which information about C1 uncorrectable codewords are passed from the C1 decoder to the C2 decoder).

The second mode, erasure-decoding, is beneficial in the case where C1 uncorrectable codewords having a large number of byte errors are used as erasure flags for C2 decoding. Conversely, the second mode likely leads to performance degradation in the case where C1 uncorrectables with only a small number of errors (only slightly beyond the error correction capability of the C1 decoder) are used as erasure flags for C2 decoding.

Therefore, it is not always beneficial to utilize erasure-decoding when implementing ECC in tape drives.

SUMMARY

In one embodiment, a tape drive includes a magnetic head having a plurality of read sensors, each read sensor being configured to read data simultaneously, a controller, and logic integrated with and/or executable by the controller. The logic is configured to read, using the plurality of read sensors, encoded data from a plurality of tracks of a magnetic tape medium simultaneously. The logic is also configured to perform track-dependent erasure decoding on the encoded data based on detection of one or more time-varying signal quality issues associated with at least one of the plurality of tracks read simultaneously from the magnetic tape medium.

In another embodiment, a method includes reading, using a plurality of read sensors of a magnetic head, encoded data from a plurality of tracks of a magnetic tape medium simultaneously. The method also includes performing track-dependent erasure decoding on the encoded data based on detection of one or more time-varying signal quality issues associated with at least one of the plurality of tracks read simultaneously from the magnetic tape medium.

In yet another embodiment, a computer program product includes a computer readable storage medium having program instructions embodied therewith. The embodied program instructions are executable by a processor to cause the processor to read, by the processor, encoded data from a plurality of tracks of a magnetic tape medium simultaneously using a plurality of read sensors of a magnetic head. The program instructions are also executable by the processor to cause the processor to perform, by the processor, track-dependent erasure decoding on the encoded data based on detection of one or more time-varying signal quality issues associated with at least one of the plurality of tracks read simultaneously from the magnetic tape medium.

Other aspects and embodiments of the present invention will become apparent from the following detailed description, which, when taken in conjunction with the drawings, illustrate by way of example the principles of the invention.

DETAILED DESCRIPTION

Figure 1:
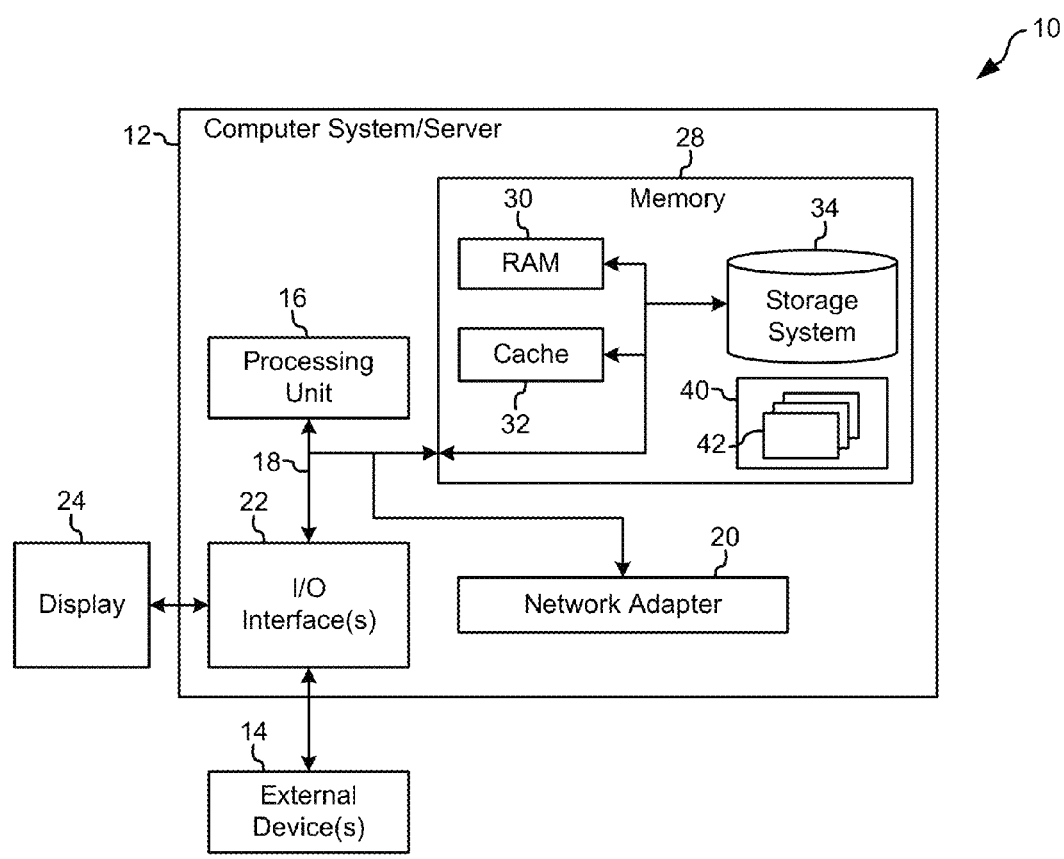
FIG. 1 illustrates a network storage system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about"±10% of the value. For example, "about 10" indicates all values from and including 9.0 to 11.0.

The following description discloses several preferred embodiments of systems, methods, and computer program products for a track-dependent decoding scheme that adapts to the time-varying signal quality of all simultaneously read tracks. This scheme reduces the probability of temporary and permanent errors resulting from decoding data that is encoded with error-correction coding (ECC) with only a small increase in computational complexity and power consumption.

In one general embodiment, a tape drive includes a magnetic head having a plurality of read sensors, each read sensor being configured to read data simultaneously, a controller, and logic integrated with and/or executable by the controller. The logic is configured to read, using the plurality of read sensors, encoded data from a plurality of tracks of a magnetic tape medium simultaneously. The logic is also configured to perform track-dependent erasure decoding on the encoded data based on detection of one or more time-varying signal quality issues associated with at least one of the plurality of tracks read simultaneously from the magnetic tape medium.

In another general embodiment, a method includes reading, using a plurality of read sensors of a magnetic head, encoded data from a plurality of tracks of a magnetic tape medium simultaneously. The method also includes performing track-dependent erasure decoding on the encoded data based on detection of one or more time-varying signal quality issues associated with at least one of the plurality of tracks read simultaneously from the magnetic tape medium.

In yet another general embodiment, a computer program product includes a computer readable storage medium having program instructions embodied therewith. The embodied program instructions are executable by a processor to cause the processor to read, by the processor, encoded data from a plurality of tracks of a magnetic tape medium simultaneously using a plurality of read sensors of a magnetic head. The program instructions are also executable by the processor to cause the processor to perform, by the processor, track-dependent erasure decoding on the encoded data based on detection of one or more time-varying signal quality issues associated with at least one of the plurality of tracks read simultaneously from the magnetic tape medium.

Referring now to FIG. 1, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth hereinabove.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the network storage system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a HDD. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, and data archival storage systems, etc.

Figure 2A:
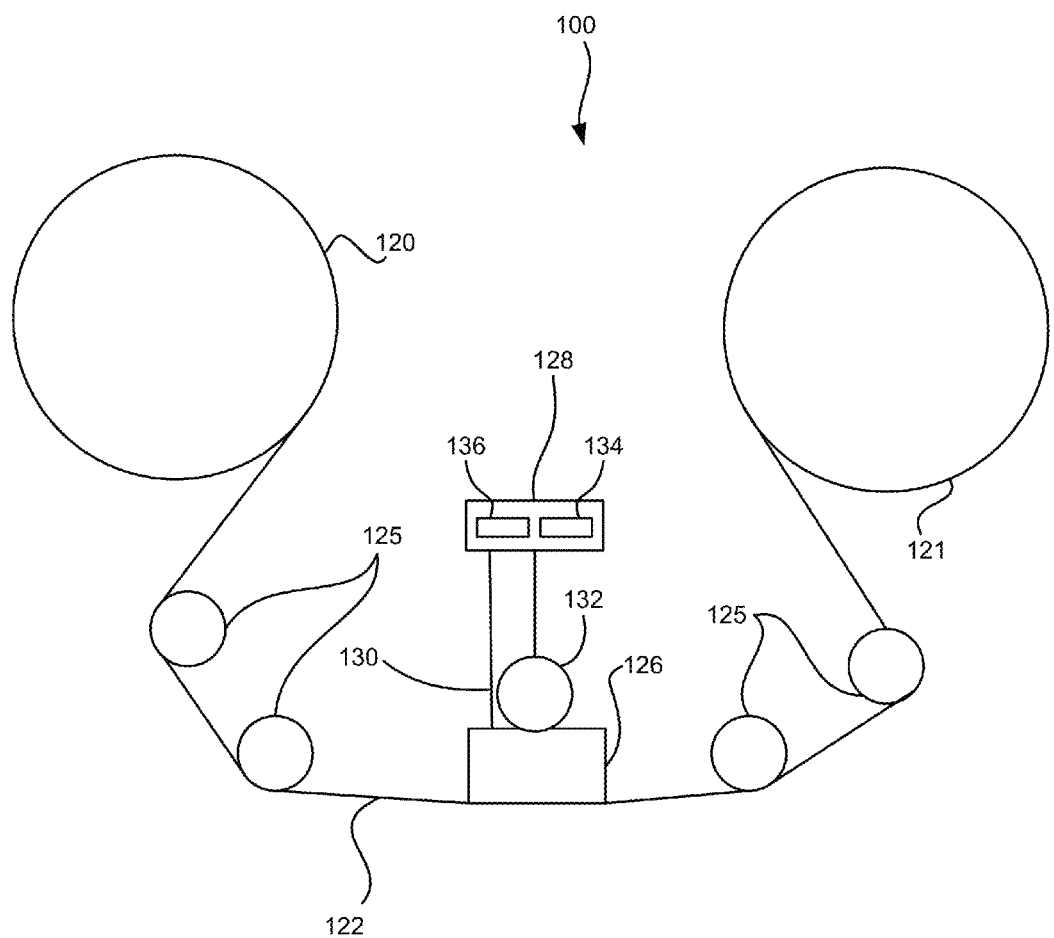
FIG. 2A illustrates a simplified tape drive of a tape-based data storage system, according to one embodiment.

FIG. 2A illustrates a simplified tape drive 100 of a tape-based data storage system, which may be employed in the context of the present invention. While one specific implementation of a tape drive is shown in FIG. 2A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 2A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the tape drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 2B:
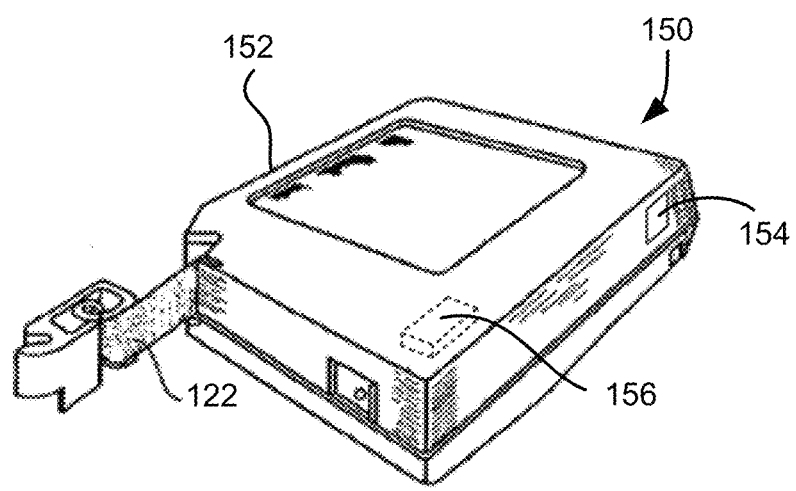
FIG. 2B is a schematic diagram of a tape cartridge according to one embodiment.

FIG. 2B illustrates an exemplary tape cartridge 150 according to one embodiment. Such tape cartridge 150 may be used with a system such as that shown in FIG. 2A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 2B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 3:
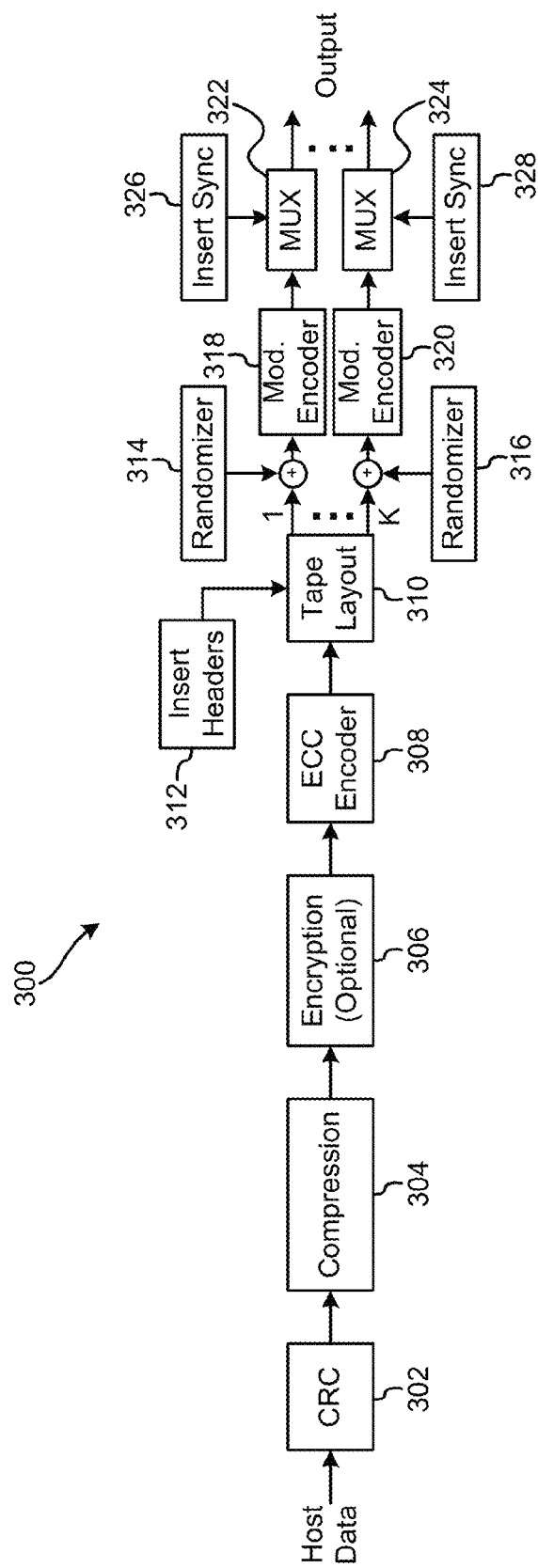
FIG. 3 illustrates a conceptual data flow in a tape drive in accordance with one embodiment.

FIG. 3 shows, in detailed form, a conceptual data flow 300 in a tape drive with K simultaneously written tracks via K write channels. The data flow 300 includes passing host data through a cyclic redundancy check (CRC) error detection encoder 302, a compression module 304, an optional encryption module 306, an error correction code (ECC) encoder 308 (which includes a C1 encoder and a C2 encoder, arranged as C1/C2, or C2/C1), and a tape layout module 310, according to one embodiment. The header insertion module 312 may be positioned as shown, feeding into the tape layout module 310, or may be positioned feeding into the ECC encoder 308, thereby allowing the headers to receive some amount of ECC encoding, in one embodiment. The tape layout module 310 splits the data into individual feeds for each channel 1, ..., K to write to the tracks of the tape medium. The data flow 300 also includes scrambling the data (data randomization) 314, ..., 316, modulation encoding 318, ..., 320, synchronization insertion 326, ..., 328, and multiplexing 322, ..., 324 for each simultaneously written track 1, ..., K.

In the following descriptions, most of these operations are not shown, in order to simplify descriptions. However, any of the descriptions herein may include additional operations not depicted, as would be understood by one of ordinary skill in the art upon reading the present descriptions. The number of tracks that may be written simultaneously depends on the tape drive being used, with the value of K ranging from 1 to 64 or more.

Figure 4:
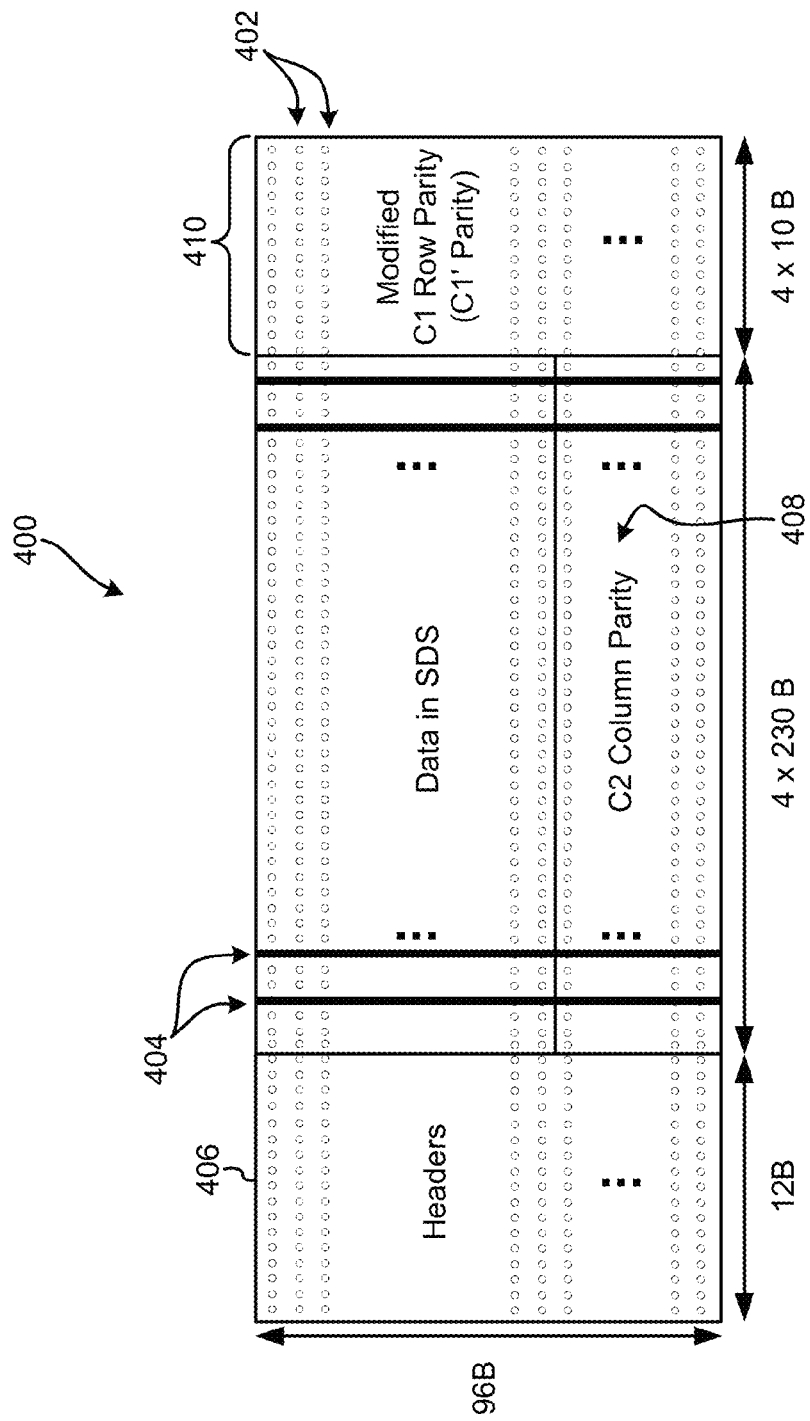
FIG. 4 shows a logical data array that may be used to organize data in a sub data set (SDS), according to one embodiment.

FIG. 4 shows a logical data array 400 that may be used to organize data in a sub data set (SDS), according to one embodiment. As shown, the data array includes a plurality of rows 402 and columns 404. Each row 402 in the data array 400 is a codeword interleave (CWI) that includes a plurality of C1 codewords. When the CWI includes four interleaved codewords, it is referred to as a CWI-4. The data in the SDS is protected by C1 encoding across each row 402 to produce C1 row parity (not shown as it is modified later to produce the data array 400), and by C2 encoding across each column 404 to produce C2 column parity 408.

As shown, the headers 406 for each row 402 may be encoded using a C1 encoding scheme by modifying the C1 parity (computed for the data in the row 402 only) to account for the headers 406 to produce C1' parity 410. In this embodiment, the headers 406 are protected by one-level ECC (C1' parity 410 only), whereas the data is protected by two-level ECC (C1' parity 410 and C2 parity 408).

Each data set includes multiple sub data sets and each sub data set may be represented by a logical two-dimensional array. Usually hundreds of headers are assigned to a single data set because each data set includes multiple SDSs and each row (CWI) of a column-encoded SDS is assigned a header.

Currently-used linear tape drives simultaneously write and read up to 32 tracks to and/or from a magnetic tape medium. C1 row codewords of a product code are written in a byte-interleaved fashion onto individual tracks of the magnetic tape medium. Due to differences in performance of the individual transducers writing and reading the parallel tracks of the magnetic tape medium, the raw error-rate of individual tracks may vary significantly from track to track, and across time for each individual track.

In order to address this variability of the raw error-rate of individual tracks, a track-dependent decoding scheme may be used, according to one embodiment that is configured to adapt to the time-varying signal quality of all tracks read simultaneously from the magnetic tape medium.

In a further embodiment, erasure pointers (that signal that a C1 codeword should be erased, instead of relying on the decoded bytes therein during C2 decoding) are generated in a manner that accounts for the track signal quality. In one approach, erasure pointers for C2 decoding are enabled if, and only if, C1 codewords include a large number of byte errors with a relatively high probability, as described in more detail later.

According to one embodiment, track-dependent erasure enable logic may be utilized in a tape drive or some other device configured to read data from a magnetic tape medium. The track-dependent erasure enable logic may use side information about the reliability of detected bytes within C1 codewords of each track to determine the probability that a C1 codeword has a number of byte errors that exceeds a predetermined threshold.

According to one embodiment, a tape drive may include a magnetic head having a plurality of read sensors. Each read sensor is configured to read data simultaneously from one track of a magnetic tape medium, thereby allowing a plurality of tracks to be read simultaneously from the magnetic tape medium, the number capable of being read simultaneously being equal to the number of read sensors of the magnetic head. Of course, some read sensors may be configured to read servo tracks for head alignment, and/or for other purposes, but for the sake of these descriptions, it is assumed that the read sensors are each capable of reading data from the magnetic tape medium.

The tape drive also includes a hardware processor and logic integrated with and/or executable by the hardware processor. The hardware processor may be a hardware processing unit and/or circuit, such as a central processing unit (CPU), an application specific integrated circuit (ASIC), a field programmable gate array (FPGA), etc., combinations thereof, or any other suitable computing device known in the art. The logic may be implemented in software, hardware, or some combination thereof. The logic is configured to read, using the plurality of read sensors, encoded data from a plurality of tracks of the magnetic tape medium simultaneously. The number of tracks that may be read simultaneously is determined by the number of read sensors of the magnetic head. The logic is also configured to perform track-dependent erasure decoding on the encoded data based on detection of one or more time-varying signal quality issues associated with at least one of the plurality of tracks read simultaneously from the magnetic tape medium.

According to one approach, the one or more time-varying signal quality issues may be determined based on side information about reliability of detected bytes within C1 codewords of each simultaneously-read track. The side information may comprise one or more of the following sources of side information: 1) statistics of channel/track performance, that may be monitored by firmware, e.g., calibration data, runtime statistics, etc., 2) C1 decoder statistics, e.g., a number of uncorrectable C1 codewords after C1 decoding; 3) read channel metrics, e.g., mean squared error (MSE), signal-to-noise ratio (SNR), etc.; and 4) run-length limited (RLL) decoder metrics, e.g., a number of error detection flags. Of course, other sources of side information may be used as would be apparent to one of skill in the art upon reading the present descriptions.

In one example, side information may comprise read or write channel performance of at least one read or write channel falling below a predetermined threshold based on statistics monitored by firmware of the tape drive. The statistics monitored for the read channel may include averaged or exponentially averaged MSE or SNR for each simultaneously read track.

In another example, side information may comprise C1 decoder performance falling below a predetermined threshold based on statistics accumulated for the C1 decoder during C1 decoding of the encoded data. The statistics accumulated for the C1 decoder may include a number of uncorrectable C1 codewords for each track.

In this example, the C1 decoder determines an uncorrectable C1 codeword in response to more than a correctable number of C1 byte errors being present in the C1 codeword. Because the C1 decoder is unable to correct the C1 codeword, presumably due to too many errors being contained therein, it may also be assumed that the C1 codeword has a great many C1 byte errors therein.

In this example, the C1 decoder performance may be determined to fall below the predetermined threshold for a specific track in response to detection of at least one uncorrectable C1 codeword read from the specific track.

In another example, the C1 decoder performance may be determined to fall below the predetermined threshold for a specific track in response to detection of more than a predetermined number (N) of uncorrectable C1 codewords within a preset number (M) of most recently decoded C1 codewords for the specific track.

According to another example, the side information may include a number of RLL error detection flags per C1 codeword. In this case, track-dependent erasure decoding is performed on the encoded data for a specific track in response to a determination of more than an allowable number of RLL error detection flags in a single C1 codeword read from the specific track.

According to any embodiment described above, the logic configured to perform track-dependent erasure decoding on the encoded data may be configured to include any or all of the following operations: perform C1 decoding of the encoded data to produce a plurality of C1 codewords, determine a probability that any of the plurality of C1 codewords individually includes a number of C1 byte errors that exceeds a predetermined threshold of C1 byte errors, enable erasure pointers for C2 decoding in response to a determination that the probability is greater than a threshold probability, insert an erasure pointer in place of each C1 codeword of the plurality of C1 codewords for which the probability is greater than the threshold probability to produce a plurality of erasure-enabled C1 codewords, and perform C2 decoding on the plurality of erasure-enabled C1 codewords using C2 error-and-erasure decoding.

According to one embodiment, erasure pointers may be enabled only on a set of tracks having a highest relative probability that a C1 codeword read from that track includes C1 byte errors exceeding the predetermined threshold of C1 byte errors. In this way, erasure pointers are not enabled on more than one track at a time, and it is always the track having the highest probability that a C1 codeword read from that track includes C1 byte errors exceeding the predetermined threshold of C1 byte errors. This ensures that operational complexity is not increased significantly in comparison with error-only decoding.

Figure 5:
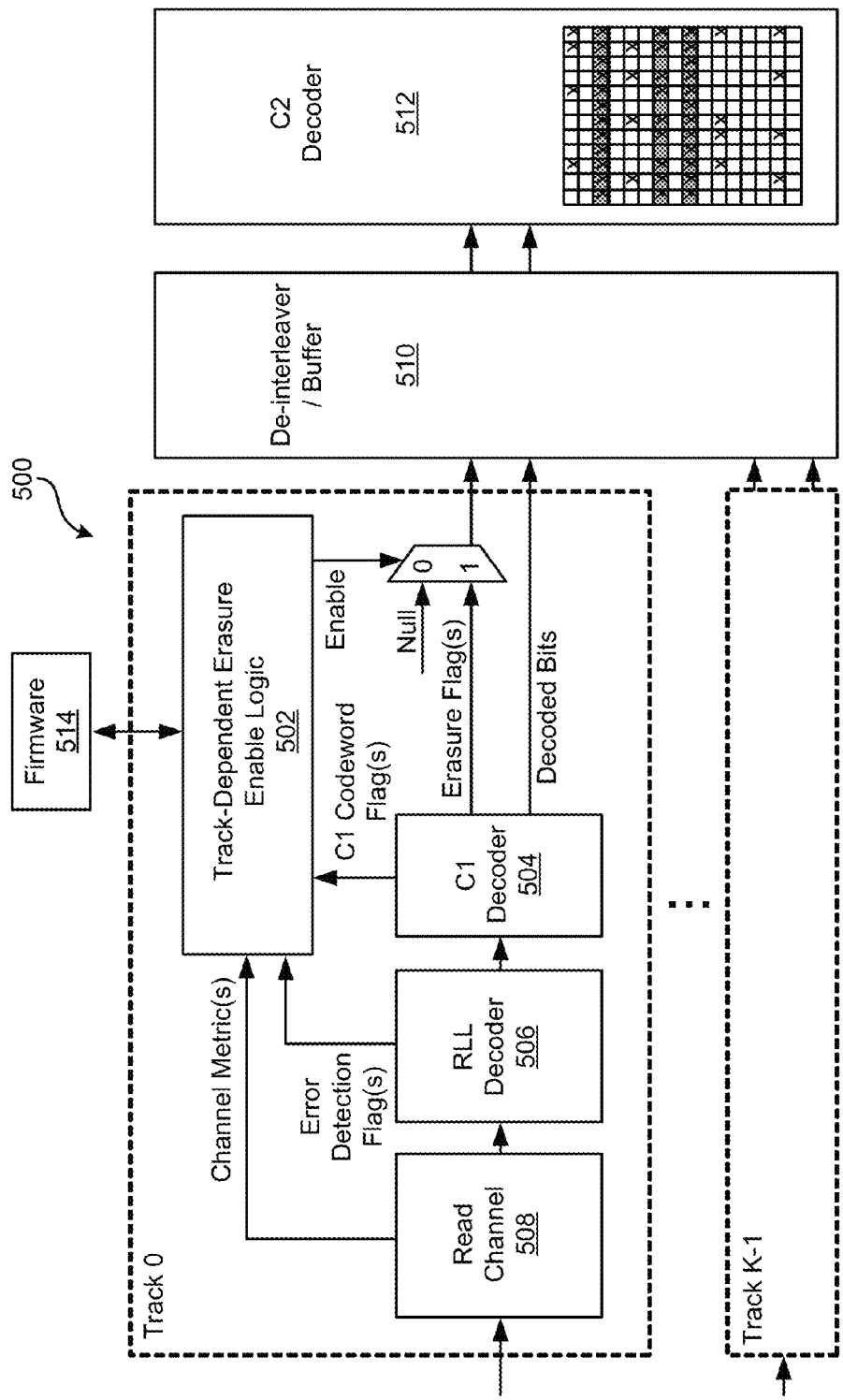
FIG. 5 shows a system having track-dependent erasure enable logic, according to one embodiment.

Now referring to FIG. 5, a system 500 configured for track-dependent decoding is shown according to one embodiment. As shown, the system 500 includes, for each of K tracks (Track 0, Track 1, . . . , Track K−1), read channel architecture 508, a RLL decoder 506 (or some other suitable modulation decoder of a type known in the art), C1 decoder 504, and track-dependent erasure enable logic 502. These various components may be included in each track, or some or all of the various components may be centralized and implemented for each track from a central implementation thereof.

In this embodiment, erasure flags for C2 decoding are enabled (as indicated by the decision block which assigns a 0, for null, or a 1, for enabled) if and only if there is a high probability that one or more C1 codewords in a specific track contain a large number of byte errors. By a large number of byte errors, what is meant is that the number of byte errors exceeds the amount of correctable byte errors within a single C1 codeword.

When a C1 decoder is able to successfully decode a C1 codeword, the C1 decoder assumes that the number of byte errors does not exceed the amount of correctable byte errors. However, this is not true in response to the C1 decoder miscorrecting bytes, in which case there are at least $d_{min}$ errors where $d_{min}$ is the minimum Hamming distance of the C1 code and the error correction capability of the C1 code, t, is t≤floor(($d_{min}$−1)/2). When the C1 decoder is unable to successfully decode a C1 codeword, then a C1 decoding failure occurs, in which case the number of byte errors must exceed the amount of correctable byte errors t≤floor(($d_{min}$−1)/2).

This decision as to what the likelihood or probability is that the number of byte errors exceeds the amount of correctable byte errors within a single C1 codeword may be based on side information, as described previously. This side information provides insight into the reliability of the detected bytes within the C1 codewords for each track, Track 0 to Track K−1.

In one embodiment, K=32, e.g., there are 32 tracks in the system 500. In some other embodiments, K may equal 16, 64, or some other positive integer.

After the erasure flags are either enabled and set, or disabled and not used, the C1 codewords, or the erasure-enabled C1 codewords (with at least one C1 codeword having an erasure flag enabled) are passed to a de-interleaver/buffer 510 to revert the interleaving of the data in the encoded data and to store the data prior to passing the data to the C2 decoder 512 for C2 decoding thereof. The C2 decoding may be error-only decoding (in response to the erasure flags not being enabled) or error-and-erasure decoding (in response to the erasure flags being enabled, as shown in FIG. 5 by the darkened rows of the array in the C2 decoder 512).

In one embodiment, the track-dependent erasure enable logic 502 may be in communication with firmware 514 of a tape drive, a tape library, or some other suitable system capable of directing the track-dependent erasure enable logic 502 before/during/after erasure enabling procedures.

Figure 6:
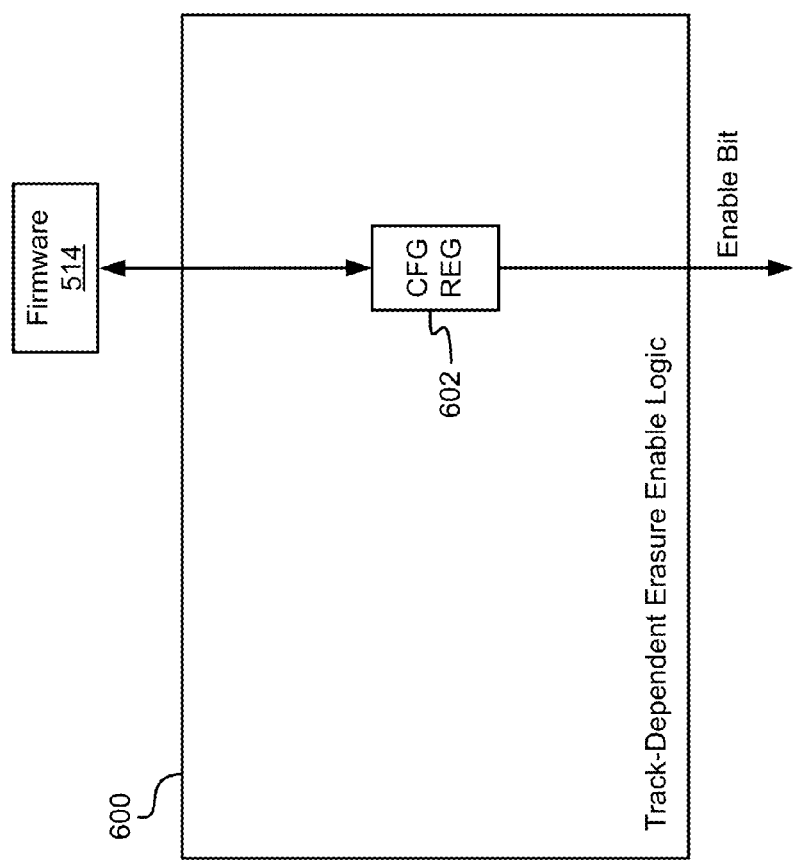
FIG. 6 shows track-dependent erasure enable logic, according to one embodiment.

Now referring to FIG. 6, an embodiment of track-dependent erasure enable logic 600 is shown. The track-dependent erasure enable logic 600 may be used in the system 500 of FIG. 5 as the track-dependent erasure enable logic 502 in one embodiment, or in any other suitable system for enabling erasure decoding in a decoder. With reference again to FIG. 6, the track-dependent erasure enable logic 600 may be implemented in hardware, software, or a combination of hardware and software. As shown, the track-dependent erasure enable logic 600 includes a read/write configuration register (CFG REG) 602. The read/write configuration register 602 is accessible from the firmware 514 via a memory mapping or some other suitable mechanism known in the art.

In one embodiment, the firmware 514 may be configured to collect statistics relating to channel/track performance. The firmware 514 may also be configured to evaluate these statistics in order to produce decisions, determinations, and/or analysis related to track/channel signal quality reliability. The statistics may include, in various embodiments, calibration results, runtime statistics such as errors, data read, data discarded, etc. Based on the evaluation of the statistics, an erase enable bit may be set and provided to the de-interleaver/buffer.

Figure 7:
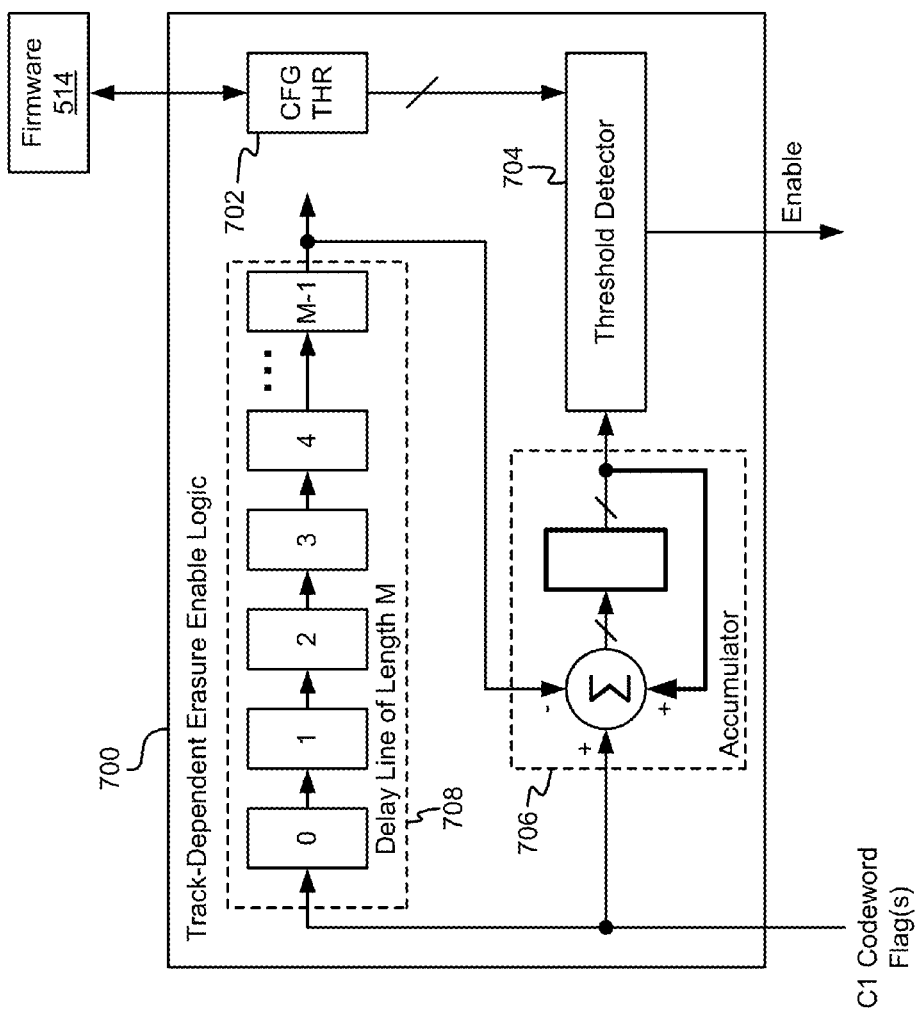
FIG. 7 shows track-dependent erasure enable logic, according to another embodiment.

Now referring to FIG. 7, an embodiment of track-dependent erasure enable logic 700 is shown. The track-dependent erasure enable logic 700 may be used in the system 500 of FIG. 5 as the track-dependent erasure enable logic 502 in one embodiment, or in any other suitable system for enabling erasure decoding in a decoder. With reference again to FIG. 7, the track-dependent erasure enable logic 700 may be implemented in hardware, software, or a combination of hardware and software.

As shown, the track-dependent erasure enable logic 700 includes a delay line 708 of length M and an accumulator 706 that may be used by the track-dependent erasure enable logic 700 to determine track/channel signal quality reliability. The delay line 708 stores '0' or '1.' In response to a C1 codeword being uncorrectable, a '1' enters the delay line 708. In response to a C1 codeword being correctable, "0" enters the delay line 708. The history of the C1 decoder statistics, specifically the uncorrectable C1 codewords output from the C1 decoder, may be used in this regard. The accumulator 706 counts the number of uncorrectable C1 codewords in the M most recent codewords, which is referred to as a sliding window of length M, and thus accumulator 706 may be referred to as a sliding window accumulator. The accumulator 706, in one embodiment, computes the sum $s_n$ of three integers: adds $a_n$='0' or '1' entering the delay line, subtracts $b_n$='0' or '1' leaving the delay line, and adds the last sum value $s_{n-1}$. Therefore, $s_n = s_{n-1} + a_n - b_n$.

The threshold detector 704 operates, in one embodiment, by determining whether more than N out of M C1 codewords are uncorrectable. By uncorrectable, what is meant is that the C1 decoder is unable to successfully correct a C1 codeword due to too many errors being present in a C1 codeword, or for some other reason known in the art. In response to a determination that more than N out of M C1 codewords are uncorrectable, the erasure flag is enabled (en=1); otherwise, the erasure flag is disabled (en=0). The sliding window length of M may be configured using the configurable threshold 702 via the firmware 514, in one approach.

Figure 8:
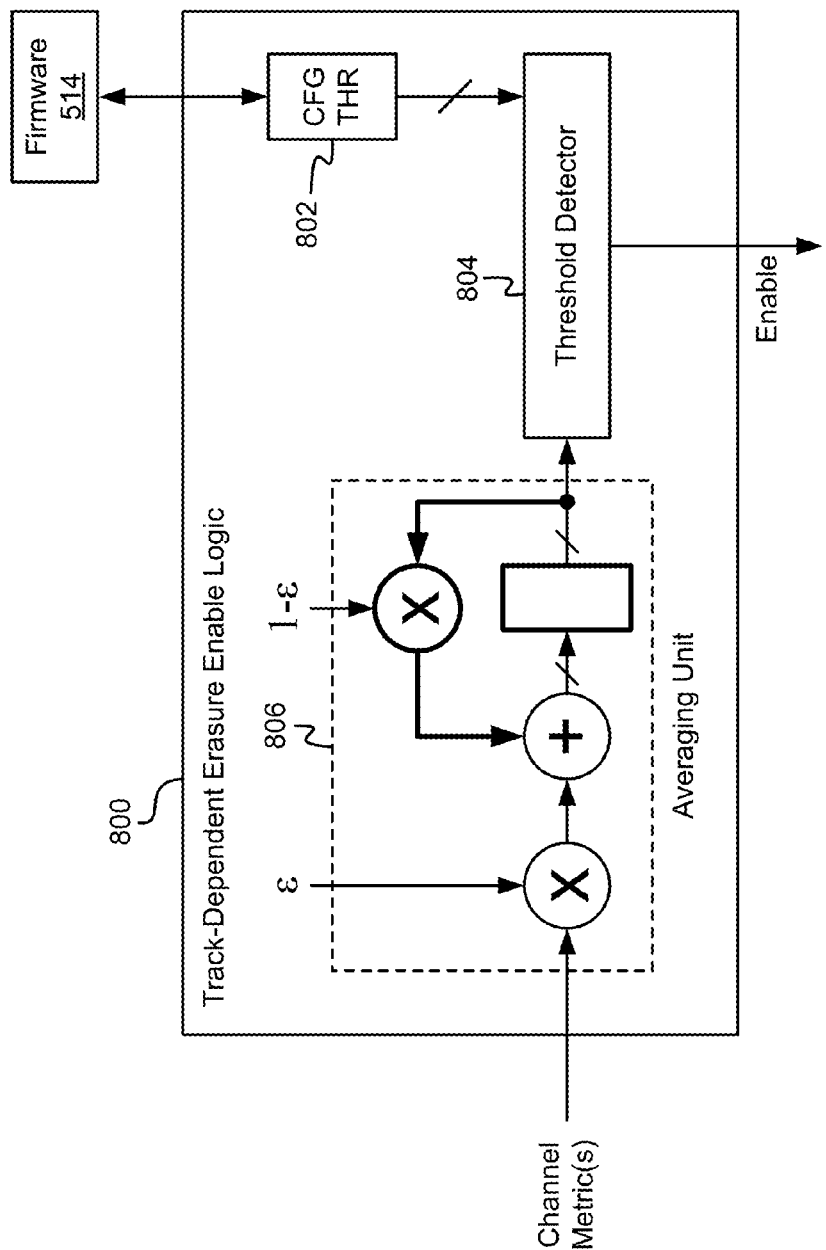
FIG. 8 shows track-dependent erasure enable logic, according to yet another embodiment.

Now referring to FIG. 8, an embodiment of track-dependent erasure enable logic 800 is shown. The track-dependent erasure enable logic 800 may be used in the system 500 of FIG. 5 as the track-dependent erasure enable logic 502 in one embodiment, or in any other suitable system for enabling erasure decoding in a decoder. With reference again to FIG. 8, the track-dependent erasure enable logic 800 may be implemented in hardware, software, or a combination of hardware and software.

As shown in FIG. 8, the track-dependent erasure enable logic 800 includes an averaging unit 806 that may be used by the track-dependent erasure enable logic 800 to determine track/channel signal quality reliability. The averaging unit 806, in one embodiment, may average one or more metrics from the read channel, such as the MSE, the SNR, or some other obtainable metric from the read channel. In one embodiment, an exponentially averaged MSE and/or SNR metric from the read channel may be calculated.

The threshold detector 804 operates, in one embodiment, by determining whether the averaged channel metric is below a predetermined and configurable threshold. In response to a determination that the averaged channel metric is below the configurable threshold, the erasure flag is enabled (en=1); otherwise, the erasure flag is disabled (en=0). The threshold may be configured using the configurable threshold (CFG THR) 802 via the firmware 514, in one approach.

In an alternate approach, a group of tracks/channels may be used and an average taken of the channel metrics for all of the channels in this group in order to make a determination as to whether the channel metric falls below the threshold as a group, rather than on a per-channel basis.

Figure 9:
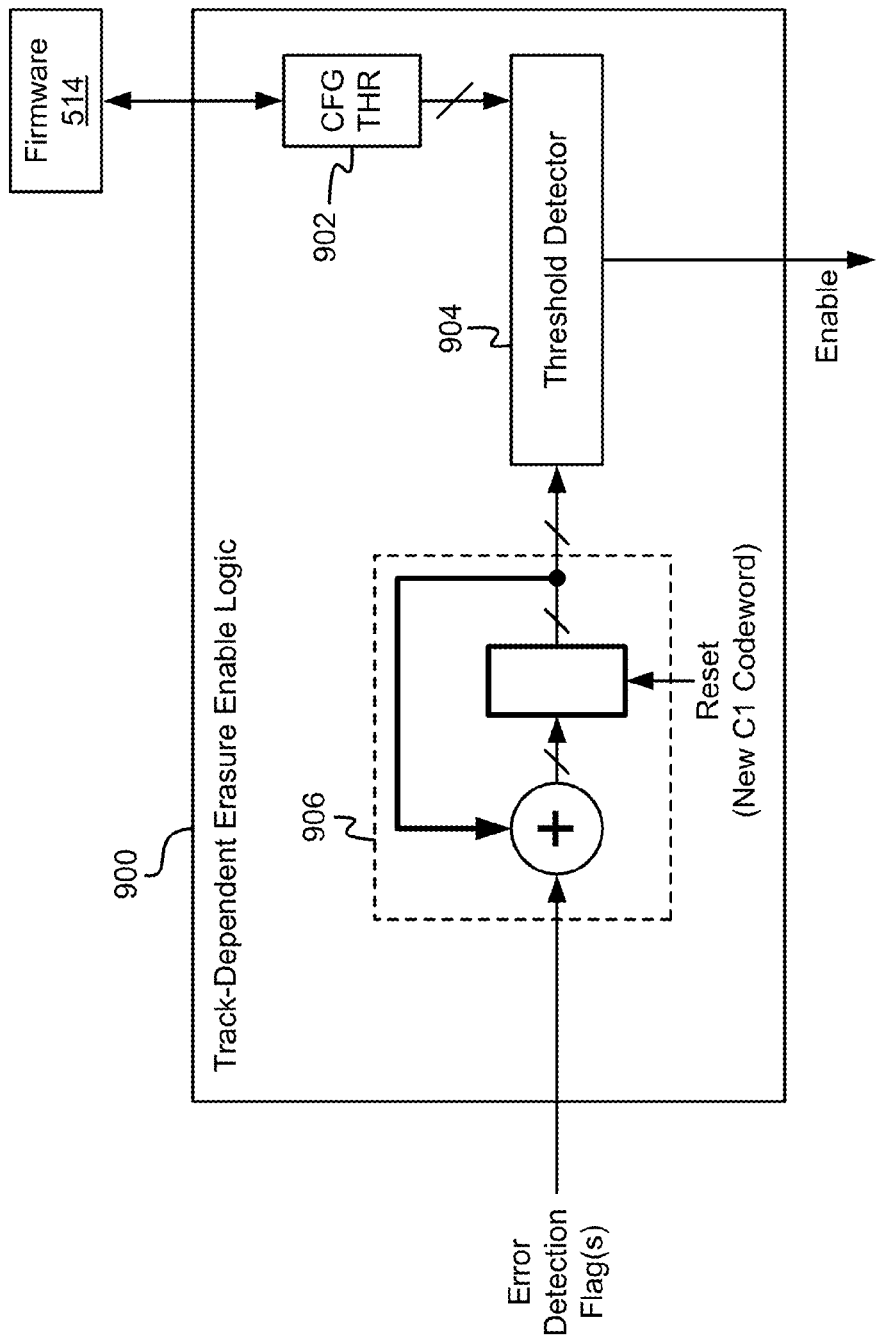
FIG. 9 shows track-dependent erasure enable logic, in accordance with an embodiment.

Now referring to FIG. 9, an embodiment of track-dependent erasure enable logic 900 is shown. The track-dependent erasure enable logic 900 may be used in the system 500 of FIG. 5 as the track-dependent erasure enable logic 502 in one embodiment, or in any other suitable system for enabling erasure decoding in a decoder. With reference again to FIG. 9, the track-dependent erasure enable logic 900 may be implemented in hardware, software, or a combination of hardware and software.

As shown in FIG. 9, the track-dependent erasure enable logic 900 includes an accumulator 906 that may be used by the track-dependent erasure enable logic 900 to determine track/channel signal quality reliability. The accumulator 906, in one embodiment, may count the number of RLL error detection flags raised per C1 codeword. In one embodiment, the accumulator 906 may include a reset mechanism to reset when a new C1 codeword is being evaluated.

The threshold detector 904 operates, in one embodiment, by determining whether the count of raised error detection flags from the RLL decoder for any particular C1 codeword is above a predetermined and configurable threshold. In response to a determination that the count of raised error detection flags from the RLL decoder for any particular C1 codeword is above the configurable threshold, the erasure flag is enabled (en=1); otherwise, the erasure flag is disabled (en=0). The threshold may be configured using the configurable threshold (CFG THR) 902 via the firmware 514, in one approach.

The RLL decoder raises an error detection flag in response to a determination that an illegal RLL codeword is received at an input to the RLL decoder.

Figure 10:
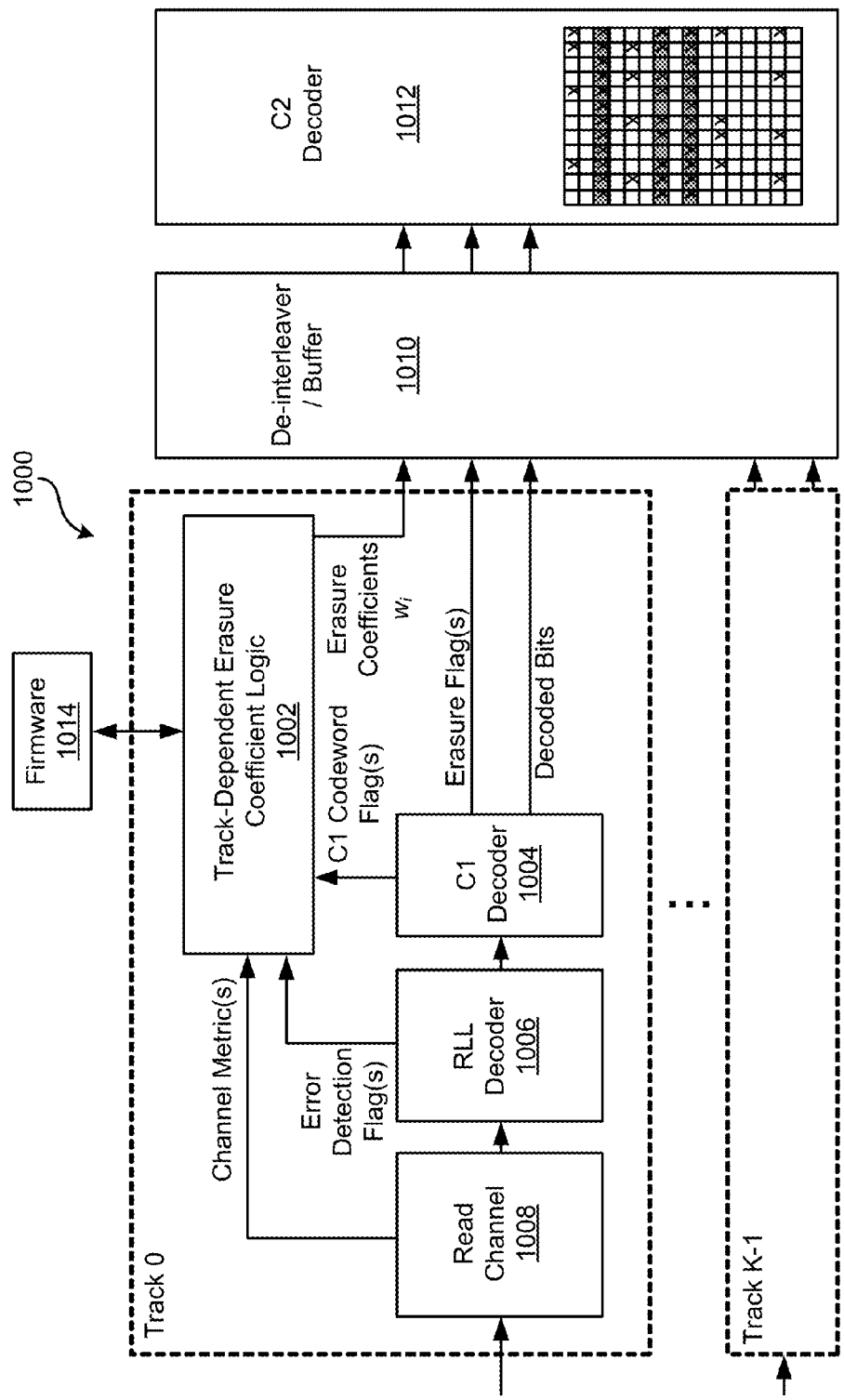
FIG. 10 shows a system having track-dependent erasure coefficient logic, according to one embodiment.

Now referring to FIG. 10, a system 1000 configured for track-dependent decoding is shown according to one embodiment. As shown, the system 1000 includes, for each of K tracks (Track 0, Track 1, . . . , Track K−1), read channel architecture 1008, a RLL decoder 1006 (or some other suitable modulation decoder of a type known in the art), C1 decoder 1004, and track-dependent erasure coefficient logic 1002. These various components may be included in each track, or some or all of the various components may be centralized and implemented for each track from a central implementation thereof.

In one embodiment, the track-dependent erasure coefficient logic 1002 may be in communication with firmware 1014 of a tape drive.

In accordance with one embodiment, erasure flags for C2 decoding are enabled if and only if there is a high probability that one or more C1 codewords in a specific track contain a large number of byte errors. This probability is indicated with erasure coefficients $w_i$, e.g., $w_0$, $w_1$, $w_2$, for each erasure flag.

Each erasure coefficient is associated with an erasure flag for C2 decoding indicated by the C1 decoder 1004, with the erasure coefficient, $w_i$, being in a range from 0 to 1, e.g., ($0 \leq w_i \leq 1$). The erasure coefficient $w_i$ is proportional to the number of byte errors within a C1 codeword, thus representing a belief/likelihood/probability that the C2 decoder 1012 should treat the corresponding C1 bytes as erasures, and not rely on the decoded information therein.

The computation of the erasure coefficients $w_i$ in the track-dependent erasure coefficient logic 1002 utilizes side information about the reliability of detected bytes within C1 codewords of each track. Any of the potential sources of side information described previously may be used, such as statistics of channel/track performance monitored by the firmware 1014, e.g., calibration data, runtime statistics, etc.; C1 decoder 1004 statistics, e.g., C1 uncorrectable codewords; read channel 1008 metrics, e.g., MSE, SNR, etc.; and RLL decoder 1006 metrics, e.g., error detection flag(s).

In one embodiment, the erasure coefficients $w_i$ in the track-dependent erasure coefficient logic 1002 are dynamically computed for each track t using the $SNR_i$ metric of track t obtained from the read channel for track t by using exponential averaging. In this case, $w_i$ is computed by considering three different SNR regimes. If $SNR_i < SNR_L$, $w_i=1$ corresponding to the low SNR regime. If $SNR_i > SNR_H$, $w_i=0$ corresponding to the high SNR regime. Otherwise, $w_i = 1 - (SNR_i - SNR_L)/(SNR_H - SNR_L)$ corresponding to the medium SNR regime. The constants $SNR_L$ and $SNR_H$ are predetermined configurable SNR values characterizing the low SNR and the high SNR regimes. For example, $SNR_L$ may equal about 12 dB and $SNR_H$ may equal about 15 dB.

In another embodiment, the erasure coefficients $w_i$ in the track-dependent erasure coefficient logic 1002 are dynamically computed for each track from the $SNR_i$ metrics of all (or a group) of tracks obtained from all (or a group) of read channels by using exponential averaging. To this end, an average (or median) $SNR_{avg}$ value is computed from the $SNR_i$ metrics of all (or a subgroup) of tracks. Furthermore, for each track the difference between its $SNR_i$ metric and the average SNR of all (or a group) of tracks $SNR_{avg}$ is computed by $\Delta SNR_i = SNR_i - SNR_{avg}$. In this case, $w_i$ is computed by considering three different SNR regimes. If $\Delta SNR_i < \Delta SNR_L$, $w_i=1$ corresponding to the low SNR regime. If $\Delta SNR_i > \Delta SNR_H$, $w_i=0$ corresponding to the high SNR regime. Otherwise, $w_i = 1 - (\Delta SNR_i - \Delta SNR_L)/(\Delta SNR_H - \Delta SNR_L)$ corresponding to the medium SNR regime. The constants $\Delta SNR_L$ and $\Delta SNR_H$ are predetermined configurable SNR values characterizing the low SNR and the high SNR regimes. For example, $\Delta SNR_L$ may equal about −2 dB and $\Delta SNR_H$ may equal about 2 dB.

In one embodiment, the erasure coefficients may be used in a determination to enable erasure decoding on a per decoded C1 codeword basis. Any erased C1 row codeword bytes may then be used as erasures during C2 error-and-erasure column codeword decoding. Once the erasure coefficients, $w_i$, of all bytes in a decoded C1 row codeword are computed and/or estimated, there will be N1 erasure coefficients in the C1 row codeword, one for each byte in the codeword. These erasure coefficients $w_i$ may be summed over all N1 decoded bytes of the C1 codeword (note: a C1 codeword has N1 bytes) to obtain the sum S, where $S = \Sigma_1^{N1} w_i$. In response to a determination that this sum S is greater than a predetermined configurable threshold, all the N1 bytes of the C1 codeword may be erased (e.g., the erase flag is enabled for the decoded C1 codeword which is then used to erase a row of decoded C1 bytes during C2 error-and-erasure column decoding). The predetermined configurable threshold may have any positive value, such as 0.1, 0.2, 0.25, 0.5, 0.6, 0.75, 1.0, 2.0, 5.0, 10.0, etc., determined based on a desired amount of errors in a codeword that causes an erasure flag to be set and a value of a typical erasure coefficient $w_i$.

The algorithm described above is a specific algorithm and there are many other possible ways to decide which bytes in a C1 codeword are to be erased. In one embodiment, the bytes determined to be erased in the C1 codeword are based on the erasure coefficients calculated for each byte in the C1 codeword.

In one embodiment, K=32, e.g., there are 32 tracks in the system 1000. In some other embodiments, K may equal 16, 64, or some other positive integer.

After the erasure flags are either enabled and set, or disabled and not used, the C1 codewords, or the erasure-enabled C1 codewords (with at least one C1 codeword having an erasure flag enabled) are passed to a de-interleaver/buffer 1010 along with the erasure coefficients $w_i$ associated with each erasure flag to revert the interleaving of the data in the encoded data and to store the data prior to passing the data to the C2 decoder 1012 for C2 decoding thereof. The C2 decoding may be error-only decoding (in response to the erasure flags not being enabled) or error-and-erasure decoding (in response to the erasure flags being enabled, as shown in FIG. 10 by the darkened rows of the array in the C2 decoder 1012).

Figure 11:
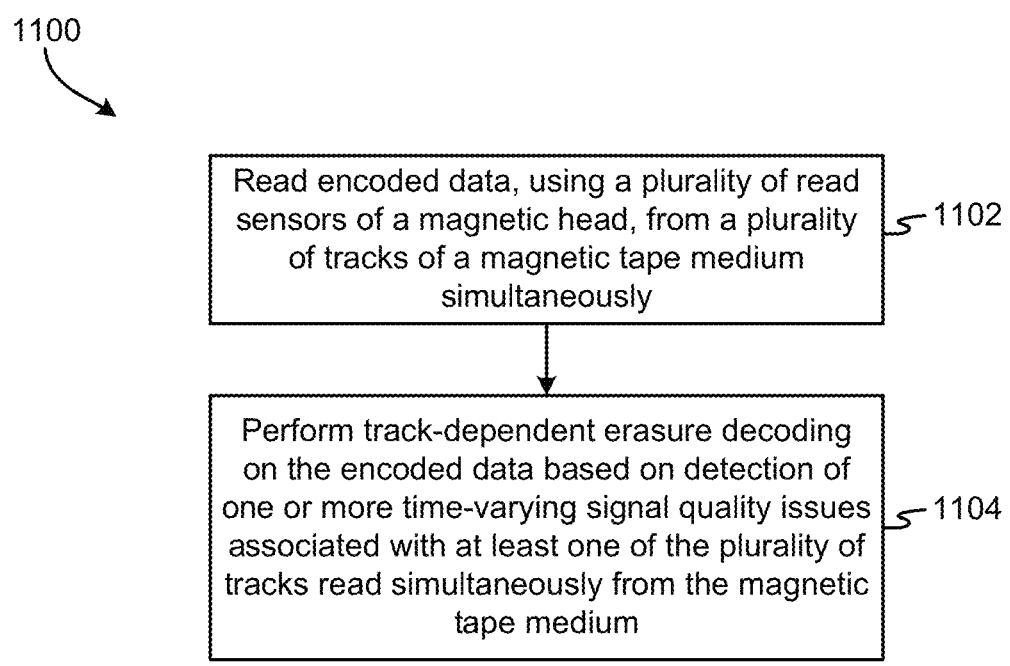
FIG. 11 shows a flowchart of a method according to one embodiment.

Now referring to FIG. 11, a flowchart of a method 1100 is shown according to one embodiment. The method 1100 may be performed in accordance with the present invention in any of the environments depicted in FIGS. 1-10, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by a controller, a processor, a tape drive, or some other device having one or more processors therein. The processor, e.g., processing circuit(s), chip(s), and/or module(s) implemented in hardware and/or software, and preferably having at least one hardware component, may be utilized in any device to perform one or more steps of the method 1100. Illustrative processors include, but are not limited to, a CPU, an ASIC, a FPGA, etc., combinations thereof, or any other suitable computing device known in the art.

As shown in FIG. 11, method 1100 may initiate with operation 1102, where a plurality of read sensors of a magnetic head are used to read encoded data from a plurality of tracks of a magnetic tape medium simultaneously. Some read sensors may be configured for reading servo tracks, while the plurality of read sensors are configured for reading data from a data portion of the magnetic tape medium.

In operation 1104, track-dependent erasure decoding is performed on the encoded data based on detection of one or more time-varying signal quality issues associated with at least one of the plurality of tracks read simultaneously from the magnetic tape medium According to one embodiment, track-dependent erasure decoding may be performed on the encoded data by the following process. First, C1 decoding of the encoded data may be performed, as would be understood to one of skill in the art, to produce a plurality of C1 codewords. Next, a probability that any of the plurality of C1 codewords individually includes a number of C1 byte errors that exceeds a predetermined threshold of C1 byte errors is determined. This determination may be made using any technique described herein according to various embodiments. Then, erasure pointers for C2 decoding are enabled in response to a determination that the probability is greater than a threshold probability. In place of each C1 codeword of the plurality of C1 codewords for which the probability is greater than the threshold probability, an erasure pointer is inserted in order to produce a plurality of erasure-enabled C1 codewords. Finally, C2 decoding is performed on the plurality of erasure-enabled C1 codewords using C2 error-and-erasure decoding, as would be understood by one of skill in the art upon reading the present descriptions.

In a further embodiment, erasure pointers are enabled only on a set of tracks having a highest relative probability that a C1 codeword read from that track includes C1 byte errors exceeding the predetermined threshold of C1 byte errors. In this way, only the worst performing track has erasure pointers enabled for subsequent C2 error-and-erasure decoding.

According to one embodiment, the one or more time-varying signal quality issues may be determined based on side information about reliability of detected bytes within C1 codewords of each simultaneously-read track. This side information may be obtained from any available source, and may be used in any manner as described herein in various embodiments, along with those not specifically mentioned. The side information may include any or all of the following: read channel performance of at least one read channel falling below a predetermined threshold based on read channel statistics monitored by firmware, write channel performance of at least one write channel falling below a predetermined threshold based on write channel statistics monitored by the firmware, C1 decoder performance falling below a predetermined threshold based on statistics accumulated for the C1 decoder during C1 decoding of the encoded data, etc.

The read channel statistics may include exponentially averaged MSE and/or SNR for each simultaneously read track, in one embodiment. The statistics accumulated for the C1 decoder may comprise a number of uncorrectable C1 codewords for each track, according to one approach. In another approach, the C1 decoder may determine an uncorrectable C1 codeword in response to more than a correctable number of C1 byte errors being present in the C1 codeword, as would be understood by one of skill in the art.

In another embodiment, it may be determined that the C1 decoder performance falls below the predetermined threshold for a specific track in response to detection of at least one uncorrectable C1 codeword read from the specific track. Moreover, the C1 decoder performance may fall below the predetermined threshold for a specific track in response to detection of more than a predetermined number (N) of uncorrectable C1 codewords within a preset number (M) of most recently decoded C1 codewords for the specific track.

The side information may include a number of RLL error detection flags per C1 codeword provided by the RLL decoder. In this case, track-dependent erasure decoding may be performed on the encoded data for a specific track in response to a determination of more than an allowable number of RLL error detection flags in a single C1 codeword read from the specific track.

In one embodiment, track-dependent erasure decoding on the encoded data may comprise the following procedure, alone or in combination with any of the other sources of side information and/or threshold evaluations regarding whether to implement erasure decoding. First, an erasure coefficient may be calculated for each byte in a particular C1 codeword read using a specific track. Each erasure coefficient is a measure of a reliability of an associated decoded byte, such that the higher the erasure coefficient, the less confidence there is in the value of the decoded byte. Then, all erasure coefficients for the particular C1 codeword are summed together to produce a sum of erasure coefficients, and it is determined whether the sum of erasure coefficients is greater than a predetermined configurable coefficient threshold. In response to a determination that the sum is greater than the predetermined configurable threshold, track-dependent erasure decoding is performed on the encoded data for any specific track that had an associated sum of erasure coefficients that is greater than the predetermined configurable coefficient threshold.

These erasure coefficients may be used in conjunction with the MSE, SNR, number of uncorrectable bytes in a C1 codeword, RLL error detection flags, or any other source of side information known in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic, software logic such as firmware, part of an operating system, part of an application program, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A tape drive, comprising:
    a magnetic head having a plurality of read sensors, each read sensor being configured to read data simultaneously; and
    a controller and logic integrated with and/or executable by the controller, the logic being configured to:
        read, using the plurality of read sensors, encoded data from a plurality of tracks of a magnetic tape medium simultaneously; and
        perform track-dependent erasure decoding on the encoded data based on detection of one or more time-varying signal quality issues associated with at least one of the plurality of tracks read simultaneously from the magnetic tape medium.

2. The tape drive as recited in claim 1, wherein the one or more time-varying signal quality issues is determined based on side information about reliability of detected bytes within C1 codewords of each simultaneously-read track.

3. The tape drive as recited in claim 2, wherein the side information comprises read or write channel performance of at least one read or write channel falling below a predetermined threshold based on statistics monitored by firmware of the tape drive.

4. The tape drive as recited in claim 3, wherein the statistics monitored for the read channel include exponentially averaged mean squared error (MSE) or signal-to-noise ratio (SNR) for each simultaneously read track.

5. The tape drive as recited in claim 2, wherein the side information comprises C1 decoder performance falling below a predetermined threshold based on statistics accumulated for the C1 decoder during C1 decoding of the encoded data.

6. The tape drive as recited in claim 5, wherein the statistics accumulated for the C1 decoder comprise a number of uncorrectable C1 codewords for each track, and wherein the C1 decoder determines an uncorrectable C1 codeword in response to more than a correctable number of C1 byte errors being present in the C1 codeword.

7. The tape drive as recited in claim 6, wherein the C1 decoder performance falls below the predetermined threshold for a specific track in response to detection of at least one uncorrectable C1 codeword read from the specific track.

8. The tape drive as recited in claim 6, wherein the C1 decoder performance falls below the predetermined threshold for a specific track in response to detection of more than a predetermined number (N) of uncorrectable C1 codewords within a preset number (M) of most recently decoded C1 codewords for the specific track.

9. The tape drive as recited in claim 2, wherein the side information comprises a number of run-length limited (RLL) error detection flags per C1 codeword, and wherein track-dependent erasure decoding is performed on the encoded data for a specific track in response to a determination of more than an allowable number of RLL error detection flags in a single C1 codeword read from the specific track.

10. The tape drive as recited in claim 1, wherein the logic configured to perform track-dependent erasure decoding on the encoded data is configured to:
    calculate an erasure coefficient for each byte in a particular C1 codeword read using a specific track, each erasure coefficient being a measure of a reliability of an associated decoded byte;
    sum all erasure coefficients for the particular C1 codeword to produce a sum of erasure coefficients;
    determine whether the sum of erasure coefficients is greater than a predetermined configurable coefficient threshold; and
    perform track-dependent erasure decoding on the encoded data for the specific track in response to a determination that the sum is greater than the predetermined configurable threshold.

11. The tape drive as recited in claim 1, wherein the logic configured to perform track-dependent erasure decoding on the encoded data is configured to:
    perform C1 decoding of the encoded data to produce a plurality of C1 codewords;
    determine a probability that any of the plurality of C1 codewords individually includes a number of C1 byte errors that exceeds a predetermined threshold of C1 byte errors;
    enable erasure pointers for C2 decoding in response to a determination that the probability is greater than a threshold probability;
    insert an erasure pointer in place of each C1 codeword of the plurality of C1 codewords for which the probability is greater than the threshold probability to produce a plurality of erasure-enabled C1 codewords; and
    perform C2 decoding on the plurality of erasure-enabled C1 codewords using C2 error-and-erasure decoding.

12. The tape drive as recited in claim 11, wherein erasure pointers are enabled only on a set of tracks having a highest relative probability that a C1 codeword read from that track includes C1 byte errors exceeding the predetermined threshold of C1 byte errors.

13. A method, comprising:
    reading, using a plurality of read sensors of a magnetic head, encoded data from a plurality of tracks of a magnetic tape medium simultaneously; and
    performing track-dependent erasure decoding on the encoded data based on detection of one or more time-varying signal quality issues associated with at least one of the plurality of tracks read simultaneously from the magnetic tape medium.

14. The method as recited in claim 13, wherein the performing track-dependent erasure decoding on the encoded data comprises:
- performing C1 decoding of the encoded data to produce a plurality of C1 codewords;
- determining a probability that any of the plurality of C1 codewords individually includes a number of C1 byte errors that exceeds a predetermined threshold of C1 byte errors;
- enabling erasure pointers for C2 decoding in response to a determination that the probability is greater than a threshold probability;
- inserting an erasure pointer in place of each C1 codeword of the plurality of C1 codewords for which the probability is greater than the threshold probability to produce a plurality of erasure-enabled C1 codewords; and
- performing C2 decoding on the plurality of erasure-enabled C1 codewords using C2 error-and-erasure decoding.

15. The method as recited in claim 14, wherein erasure pointers are enabled only on a set of tracks having a highest relative probability that a C1 codeword read from that track includes C1 byte errors exceeding the predetermined threshold of C1 byte errors.

16. The method as recited in claim 13, wherein the one or more time-varying signal quality issues is determined based on side information about reliability of detected bytes within C1 codewords of each simultaneously-read track.

17. The method as recited in claim 16, wherein the side information is selected from a group consisting of:
- read channel performance of at least one read channel falling below a predetermined threshold based on read channel statistics monitored by firmware;
- write channel performance of at least one write channel falling below a predetermined threshold based on write channel statistics monitored by the firmware; and
- C1 decoder performance falling below a predetermined threshold based on statistics accumulated for the C1 decoder during C1 decoding of the encoded data,
- wherein the read channel statistics include exponentially averaged mean squared error (MSE) or signal-to-noise ratio (SNR) for each simultaneously read track,
- wherein the statistics accumulated for the C1 decoder comprise a number of uncorrectable C1 codewords for each track, and
- wherein the C1 decoder determines an uncorrectable C1 codeword in response to more than a correctable number of C1 byte errors being present in the C1 codeword.

18. The method as recited in claim 17, wherein the C1 decoder performance falls below the predetermined threshold for a specific track in response to detection of at least one uncorrectable C1 codeword read from the specific track.

19. The method as recited in claim 18, wherein the C1 decoder performance falls below the predetermined threshold for a specific track in response to detection of more than a predetermined number (N) of uncorrectable C1 codewords within a preset number (M) of most recently decoded C1 codewords for the specific track.

20. The method as recited in claim 16, wherein the side information comprises a number of run-length limited (RLL) error detection flags per C1 codeword, and wherein track-dependent erasure decoding is performed on the encoded data for a specific track in response to a determination of more than an allowable number of RLL error detection flags in a single C1 codeword read from the specific track.

21. The method as recited in claim 13, wherein the performing track-dependent erasure decoding on the encoded data comprises:
- calculating an erasure coefficient for each byte in a particular C1 codeword read using a specific track, each erasure coefficient being a measure of a reliability of an associated decoded byte;
- summing all erasure coefficients for the particular C1 codeword to produce a sum of erasure coefficients;
- determining whether the sum of erasure coefficients is greater than a predetermined configurable coefficient threshold; and
- performing track-dependent erasure decoding on the encoded data for the specific track in response to a determination that the sum is greater than the predetermined configurable threshold.

22. A computer program product, the computer program product comprising a computer readable storage medium having program instructions embodied therewith, the embodied program instructions being executable by a processor to cause the processor to:
- read, by the processor, encoded data from a plurality of tracks of a magnetic tape medium simultaneously using a plurality of read sensors of a magnetic head; and
- perform, by the processor, track-dependent erasure decoding on the encoded data based on detection of one or more time-varying signal quality issues associated with at least one of the plurality of tracks read simultaneously from the magnetic tape medium.

23. The computer program product as recited in claim 22, wherein the embodied program instructions executable by the processor to cause the processor to perform track-dependent erasure decoding on the encoded data further cause the processor to:
- perform, by the processor, C1 decoding of the encoded data to produce a plurality of C1 codewords;
- determine, by the processor, a probability that any of the plurality of C1 codewords individually includes a number of C1 byte errors that exceeds a predetermined threshold of C1 byte errors;
- enable, by the processor, erasure pointers for C2 decoding in response to a determination that the probability is greater than a threshold probability;
- insert, by the processor, an erasure pointer in place of each C1 codeword of the plurality of C1 codewords for which the probability is greater than the threshold probability to produce a plurality of erasure-enabled C1 codewords; and
- perform, by the processor, C2 decoding on the plurality of erasure-enabled C1 codewords using C2 error-and-erasure decoding.

24. The computer program product as recited in claim 22, wherein erasure pointers are enabled only on a set of tracks having a highest relative probability that a C1 codeword read from that track includes C1 byte errors exceeding the predetermined threshold of C1 byte errors.

25. The computer program product as recited in claim 22, wherein the one or more time-varying signal quality issues is determined based on side information about reliability of detected bytes within C1 codewords of each simultaneously-read track, and wherein the side information is selected from a group consisting of:
- read channel performance of at least one read channel falling below a predetermined threshold based on read channel statistics monitored by firmware;

write channel performance of at least one write channel falling below a predetermined threshold based on write channel statistics monitored by the firmware; and C1 decoder performance falling below a predetermined threshold based on statistics accumulated for the C1 decoder during C1 decoding of the encoded data.

* * * * *